United States Patent
Cui et al.

(10) Patent No.: US 11,937,204 B2
(45) Date of Patent: *Mar. 19, 2024

(54) UE CAPABILITY INDICATION TO POSITIONING SERVER

(71) Applicant: Apple Inc., Cupertino, CA (US)

(72) Inventors: Jie Cui, Santa Clara, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 48 days.

This patent is subject to a terminal disclaimer.

(21) Appl. No.: 17/464,639

(22) Filed: Sep. 1, 2021

(65) Prior Publication Data

US 2022/0061017 A1    Feb. 24, 2022

Related U.S. Application Data

(63) Continuation of application No. 16/487,406, filed as application No. PCT/US2018/025711 on Apr. 2, 2018, now Pat. No. 11,134,464.

(Continued)

(51) Int. Cl.
*H04W 64/00* (2009.01)
*G01S 5/10* (2006.01)
(Continued)

(52) U.S. Cl.
CPC .......... *H04W 64/003* (2013.01); *G01S 5/10* (2013.01); *H04L 5/0048* (2013.01); *H04W 24/10* (2013.01); *H04W 72/51* (2023.01)

(58) Field of Classification Search
CPC ... H04W 64/003; H04W 72/51; H04W 64/00; H04W 24/10; H04W 64/006; H04W 48/16
(Continued)

(56) References Cited

U.S. PATENT DOCUMENTS

| | | |
|---|---|---|
| 11,134,464 B2 | 9/2021 | Cui et al. |
| 2011/0159886 A1* | 6/2011 | Kangas ................. H04W 64/00 455/456.1 |

(Continued)

FOREIGN PATENT DOCUMENTS

| | | |
|---|---|---|
| CN | 102461292 | 5/2012 |
| CN | 102858010 | 1/2013 |

(Continued)

OTHER PUBLICATIONS

PCT International Search Report and Written Opinion in International Appln. No. PCT/US2018/025711, dated Jun. 19, 2018, 11 pages.

(Continued)

*Primary Examiner* — David Q Nguyen
(74) *Attorney, Agent, or Firm* — Fish & Richardson P.C.

(57) ABSTRACT

Embodiments of the present disclosure describe methods, apparatuses, storage media, and systems for delivering UE capability indication to a positioning server in a wireless communication network. A user equipment (UE) or access note (AN) may notify a positioning server of UE capability information associated with positioning measurements so that the positioning server may determine corresponding positioning measurement configurations based on acknowledgement of such UE capability information in terms of the positioning measurement. Embodiments describe UE capability indications to a positioning server that may enable flexible deployment and integration of various types of UEs. Other embodiments may be described and claimed.

18 Claims, 7 Drawing Sheets

Related U.S. Application Data

(60) Provisional application No. 62/480,980, filed on Apr. 3, 2017.

(51) Int. Cl.
  *H04L 5/00* (2006.01)
  *H04W 24/10* (2009.01)
  *H04W 72/51* (2023.01)

(58) Field of Classification Search
  USPC .................. 455/456.1; 370/328, 329, 330
  See application file for complete search history.

(56) References Cited

U.S. PATENT DOCUMENTS

| | | |
|---|---|---|
| 2012/0015667 A1* | 1/2012 | Woo .................. G01S 1/20 455/456.1 |
| 2012/0136623 A1 | 5/2012 | Edge |
| 2013/0017841 A1* | 1/2013 | Kazmi .................. G01S 5/0236 455/456.1 |
| 2013/0059610 A1 | 3/2013 | Siomina et al. |
| 2014/0217666 A1* | 8/2014 | Busskamp .......... B05B 13/0431 269/287 |
| 2015/0141048 A1 | 5/2015 | Woo et al. |
| 2015/0257121 A1* | 9/2015 | Siomina ................ G01S 5/0226 455/456.6 |
| 2016/0234709 A1 | 8/2016 | Fischer |
| 2016/0248563 A1 | 8/2016 | Behravan et al. |
| 2016/0295374 A1 | 10/2016 | Persson et al. |
| 2016/0345229 A1 | 11/2016 | Das et al. |
| 2016/0352405 A1 | 12/2016 | Challa et al. |
| 2016/0360370 A1 | 12/2016 | Edge et al. |
| 2017/0279487 A1 | 9/2017 | Kazmi et al. |
| 2017/0339660 A1* | 11/2017 | Kazmi ................ H04W 64/003 |
| 2018/0011163 A1 | 1/2018 | Han |
| 2018/0054795 A1 | 2/2018 | Edge |
| 2018/0132061 A1 | 5/2018 | Bitra et al. |
| 2018/0132200 A1 | 5/2018 | Gheorghiu et al. |
| 2019/0353746 A1* | 11/2019 | Razavi ................. G01S 5/0231 |
| 2020/0045667 A1 | 2/2020 | Razavi et al. |
| 2020/0059888 A1 | 2/2020 | Cui et al. |
| 2020/0059894 A1 | 2/2020 | Siomina et al. |

FOREIGN PATENT DOCUMENTS

| | | | |
|---|---|---|---|
| CN | 103004267 | 3/2013 | |
| CN | 103154765 | 6/2013 | |
| CN | 103202051 | 7/2013 | |
| CN | 104854931 | 8/2015 | |
| JP | 6826187 B2 * | 2/2021 | ........... G01S 5/0221 |
| WO | WO 2012023891 | 2/2012 | |
| WO | WO-2012023891 A1 * | 2/2012 | ........... G01S 5/0205 |
| WO | WO 2014021766 | 2/2014 | |
| WO | WO 2015139184 | 9/2015 | |
| WO | WO 2017034182 | 3/2017 | |

OTHER PUBLICATIONS

PCT International Preliminary Report on Patentability in International Appln. No. PCT/US2018/025711, dated Oct. 8, 2019, 5 pages.

* cited by examiner

UE CAPABILITY INDICATION TO POSITIONING SERVER

CROSS REFERENCE TO RELATED APPLICATION

The present application is a continuation application of U.S. patent application Ser. No. 16/487,406, filed Aug. 20, 2019, entitled "UE Capability Indication To Positioning Server," which is a national phase entry under 35 U.S.C. § 371 of International Application No. PCT/US2018/025711, filed Apr. 2, 2018, entitled "UE Capability Indication To Positioning Server," which claims priority to U.S. Provisional Patent Application No. 62/480,980, filed Apr. 3, 2017, entitled "UE Capability Indication to Positioning Server," the entire disclosures of which are hereby incorporated by reference in its their entireties.

FIELD

Embodiments of the present invention relate generally to the technical field of wireless communications.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

In some wireless networks, it may be useful to enable a user equipment (UE) positioning function of long term evolution (LTE), which provides the mechanisms to support or assist calculations of the geographical position of a UE. UE position knowledge can be used, for example, in support of Radio Resource Management functions, as well as location-based services for operators, subscribers, and third-party service providers.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
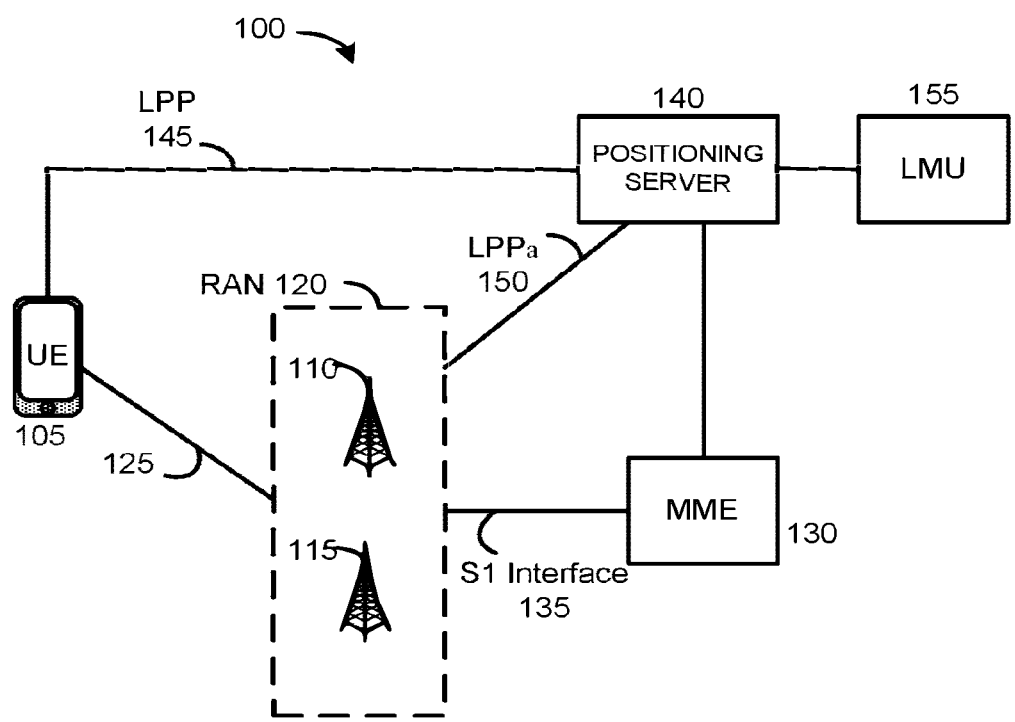
FIG. 1 schematically illustrates an example of a network comprising a UE in a wireless network, in accordance with various embodiments.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrases "A, B, or C" and "A, B, and/or C" mean (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include any combination of integrated circuits (for example, a field-programmable gate array ("FPGA") an application specific integrated circuit ("ASIC"), etc.), discrete circuits, combinational logic circuits, system on a chip, SOC, system in a package, SiP, that provides the described functionality. In some embodiments, the circuitry may execute one or more software or firmware modules to provide the described functions. In some embodiments, circuitry may include logic, at least partially operable in hardware.

In embodiments, apparatuses, methods, and storage media may be described for delivering UE capability indication to a positioning server in a wireless communication network. Two receiver (2Rx) antennas of a UE are used in calculating geographical positions in positioning related measurements in existing LTE communications. Relevant procedures and methods of such positioning related measurements are, therefore, designed under the consideration of 2Rx UEs. A variety of different LTE-enabled devices may be used in various applications within multiple market segments. In some instances, low-cost UEs may not be equipped with 2Rx antennas, or some UEs may not use both antennas for positioning measurements. Other UEs may be equipped with 4Rx antennas due to other UE implementations. Thus, the 2Rx UE assumption may not be maintained for positioning measurements in all case scenarios. Embodiments describe UE capability indications to a positioning server that may enable flexible deployment and integration of various types of UEs.

FIG. 1 schematically illustrates an example wireless network 100 (hereinafter "network 100") in accordance with various embodiments herein. The network 100 may include a UE 105 coupled with one or more access nodes (ANs), for example, ANs 110, 115. The UE 105 is illustrated as a smartphone (e.g., a handheld touchscreen mobile computing device connectable to one or more cellular networks), but may also comprise any mobile or non-mobile computing devices, such as a Personal Data Assistant (PDA), pager, laptop computer, desktop computer, wireless handset, or any computing device including a wireless communications interface.

In some embodiments, the UE 105 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive message, status updates, location related services, etc.).

The UE 105 may be configured to connect, for example, communicatively couple, with a radio access network (RAN) 120. The RAN 120 may be, for example, an Evolved Universal Mobile Telecommunications System (UMTS) Terrestrial Radio Access Network (E-UTRAN), a NextGen RAN (NG RAN), or some other type of RAN. The UE 105 may be connected with the RAN 120 by connections 125, which comprise a physical communications interface or layer. In this example, the connections 125 are illustrated as an air interface to enable communicative coupling, and can be consistent with cellular communications protocols such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

The RAN 120 can include the ANs 110 and 115 that enable the connections 125. These ANs 110 and 115 can be referred to as base stations (BSs), NodeBs, evolved NodeBs (eNBs), next Generation NodeBs (gNBs), RAN nodes, serving cells, and so forth, and can comprise ground stations (e.g., terrestrial access points) or satellite stations providing coverage within a geographic area (e.g., a cell).

Any of the ANs 110 and 115 can terminate the air interface protocol and can be the first point of contact for the UE 105. In some embodiments, any of the ANs 110 and 115 can fulfill various logical functions for the RAN 120 including, but not limited to, radio network controller (RNC) functions such as radio bearer management, uplink and downlink dynamic radio resource management and data packet scheduling, and mobility management.

In some embodiments, a downlink resource grid can be used for downlink transmissions from any of the RAN nodes, for example, ANs 110 and 115 to the UE 105, while uplink transmissions can utilize similar techniques. The grid can be a time-frequency grid, called a resource grid or time-frequency resource grid, which is the physical resource in the downlink in each slot. Such a time-frequency plane representation is a common practice for orthogonal frequency division multiplexing (OFDM) systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 105. The physical downlink control channel (PDCCH) may carry information about the transport format and resource allocations related to the PDSCH channel, among other things. It may also inform the UE 105 about the transport format, resource allocation, and H-ARQ (Hybrid Automatic Repeat Request) information related to the uplink shared channel. Typically, downlink scheduling (assigning control and shared channel resource blocks to the UE 105 within a cell) may be performed at any of the RAN access nodes 110 and 115 based on channel quality information fed back from any of the UE 105. The downlink resource assignment information may be sent on the PDCCH used for (e.g., assigned to) each of the UE 105.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

The RAN 120 is shown to be communicatively coupled to a mobility management entity (MME) 130 in a core network (CN), via an S1 interface 135. The MME 130 may manage mobility aspects in access such as gateway selection and tracking area list management.

In an embodiment of UE positioning measurement operations, the MME 130 may receive a request for some location service associated with a particular target, for example, UE 105 from another entity. The other entity may be, for example, a gateway mobile location center (GMLC) or another UE. Alternatively, the MME 130 itself may decide to initiate some location service on behalf of a particular target UE. This may occur, for example, when the UE 105 initiates an IP Multimedia Subsystem (IMS) emergency call. The MME 130 may send a location service request to a positioning server 140, for example, an enhanced serving mobile location centre (eSMLC). For an uplink method, the positioning server 140 may process the location services request sent from the MME 130. The positioning server 140 may then return the result of the location service back to the MME 130. The result may be, for example, a position estimate of the UE 105 and/or an indication of any assistance data transferred to the UE 105. In the case of a location service requested by an entity other than the MME 130, for example, another UE or a positioning server 140, the MME 130 may return the location service result to the entity.

In some embodiments, the positioning server 140 may interact with the UE 105 to obtain information assisting position measurements for the UE 105 via an LTE Positioning Protocol (LPP) 145. In some other embodiments, the positioning server 140 may interact with the access nodes, for example, ANs 110, 115 to obtain information assisting position measurements for the UE 105 via an LTE Positioning Protocol Annex (LPPa) 150.

In some other embodiment of E-UTRAN positioning operations, a positioning server may interact with devices in the E-UTRAN to obtain measurement information to assist one or more position measurements for UEs.

Some embodiments may include a Location Measurement Unit (LMU) 155 to make positioning measurements and communicate those measurements to the positioning server 140. All positioning measurements obtained by the LMU 155 may be supplied to the positioning server 140 that made the request. A UE positioning measurement request may involve measurements by multiple LMUs.

Figure 2:
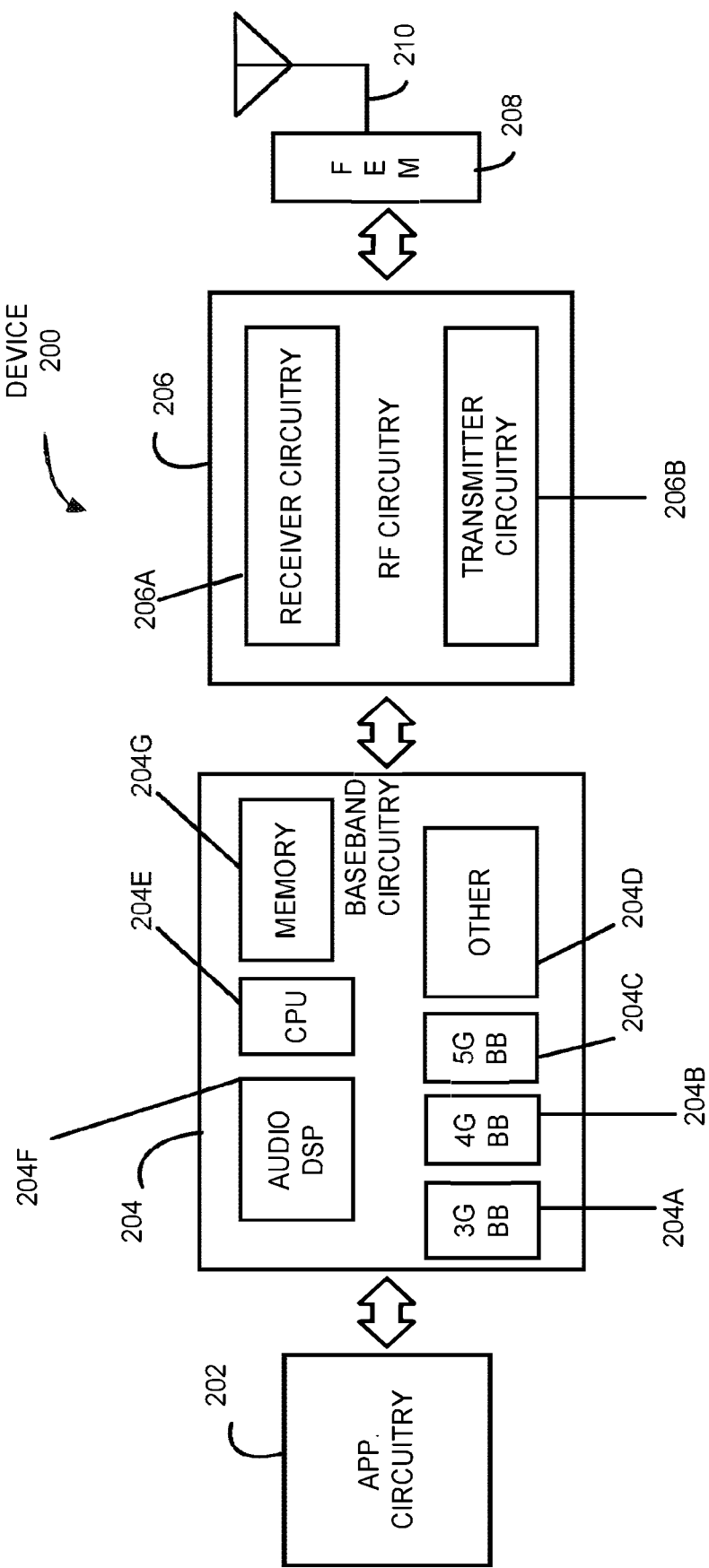
FIG. 2 illustrates example components of a device in accordance with various embodiments.

FIG. 2 illustrates example components of a device 200 in accordance with some embodiments. In some embodiments, the device 200 may include application circuitry 202, baseband circuitry 204, RF circuitry 206, front-end module (FEM) circuitry 208, and one or more antennas 210 together at least as shown. The components of the illustrated device 200 may be included in a UE, an AN, or a positioning server. In some embodiments, the device 200 may include fewer elements (e.g., an AN may not utilize application circuitry 202, and instead include a processor/controller to process IP data received from an evolved packet core (EPC)). In some embodiments, the device 200 may include additional elements such as, for example, a memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include one or more switches, filters, amplifiers, etc. to facilitate the communication with the wireless network. RF circuitry 206 may include receiver circuitry 206A, which may include circuitry to down-convert RF signals received from the FEM circuitry 208 and provide baseband signals to the baseband circuitry 204. RF circuitry 206 may also include transmitter circuitry 206B, which may include circuitry to up-convert baseband signals provided by the baseband circuitry 204 and provide RF output signals to the FEM circuitry 208 for transmission.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio integrated circuit (IC) circuitry may be provided for processing signals for each spectrum, although the scope of the embodiments is not limited in this respect.

FEM circuitry 208 may include a receive signal path, which may include circuitry configured to operate on RF signals received from one or more antennas 210, amplify the received signals and provide the amplified versions of the received signals to the RF circuitry 206 for further processing. FEM circuitry 208 may also include a transmit signal path, which may include circuitry configured to amplify signals for transmission provided by the RF circuitry 206 for transmission by one or more of the one or more antennas 210. In various embodiments, the amplification through transmit or receive signal paths may be done solely in the RF circuitry 206, solely in the FEM 208, or in both the RF circuitry 206 and the FEM 208.

In some embodiments, the FEM circuitry 208 may include a TX/RX switch to switch between transmit mode and receive mode operation. The FEM circuitry 208 may include a receive signal path and a transmit signal path. The receive signal path of the FEM circuitry 208 may include an low noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 202 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/AN, described in further detail below.

A UE is conventionally equipped with two receiver (2Rx) chains coupled with respective receiver antennas. In an existing positioning measurement event, for example, a reference signal time difference (RSTD) measurement event, both the Rx chains of a 2Rx UE may be used to measure and provide RSTD measurement reporting associated with multiple serving cells in a network. Each RSTD measurement needs to be conducted and reported within a certain time. If the UE 105 fails to report back to the positioning server 140 with respect to the RSTD within the prescribed time, the conducted RSTD measurement is considered to be a failed one, which may lead to less inaccurate positioning measurements. However, with newly introduced UE categories, a UE may be just equipped with one Rx chain coupled with a single antenna. UEs equipped with one Rx chain may become more popular in low-cost or certain other implementations (e.g., machine type communications (MTC), enhanced MTC). LTE UE category 0, category 1bis, and category M are some example UE categories of which UEs may only be equipped with a single Rx chain and its receiver antenna. Meanwhile, UEs equipped with more than two Rx chains are also under development (e.g., 4Rx UEs).

Figure 3:
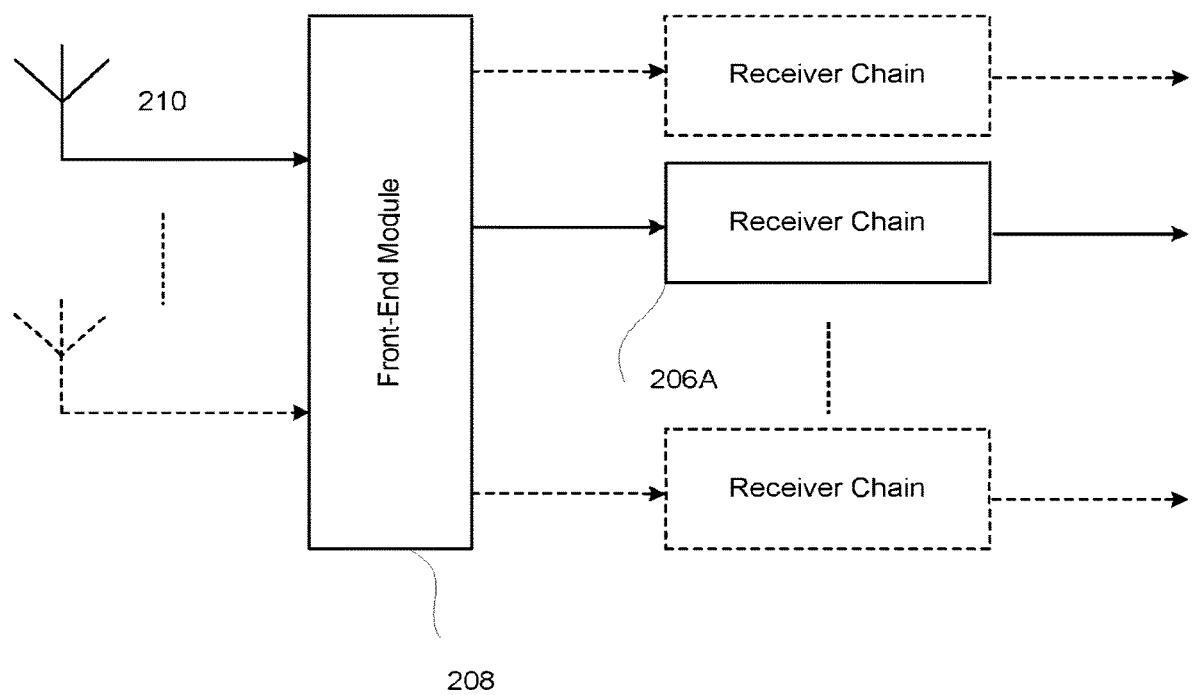
FIG. 3 further illustrates example radio frequency (RF) circuitry equipped with one or more receiver chains in accordance with some embodiments.

FIG. 3 illustrates receiver architecture components of the device 200 in more detail in accordance with some embodiments. In particular, FIG. 3 shows RF circuitry 206 having one or more Rx chains 206A. FIG. 3 shows one Rx chain 206A coupled with one antenna 210 in solid-lined blocks. Additional antennas/Rx chains are shown in dashed-lined blocks to illustrate alternative devices with two or more Rx chains. When only one Rx chain is available for positioning measurements rather than two Rx chains, additional time delay may be required to accomplish the measurement. If the same time delay as for 2Rx UEs is maintained for 1Rx UEs, the positioning accuracy might be sacrificed, which may lead to either less accurate or inaccurate positioning measurement, or positioning measurement failure.

Current positioning measurements assume all UEs in the measurement are 2Rx UEs, and a positioning server does not have knowledge with regard to the UE capability associated with the positioning measurement. Thus, less accurate or inaccurate positioning measurement may occur with respect to 1Rx UEs while the measurement is under configurations for 2Rx UEs.

To address the above-mentioned issue caused by 1Rx UEs in a positioning measurement, embodiments bring in multiple solutions by notifying the positioning server with respect to the UE capability information in terms of the positioning measurement. In these methods, a positioning server may be notified that a target UE in the positioning measurement is equipped with one Rx chain rather than two Rx chains so that the positioning server may accommodate corresponding positioning measurement configurations based on acknowledgement of such UE capability information in terms of the positioning measurement.

Figure 4:
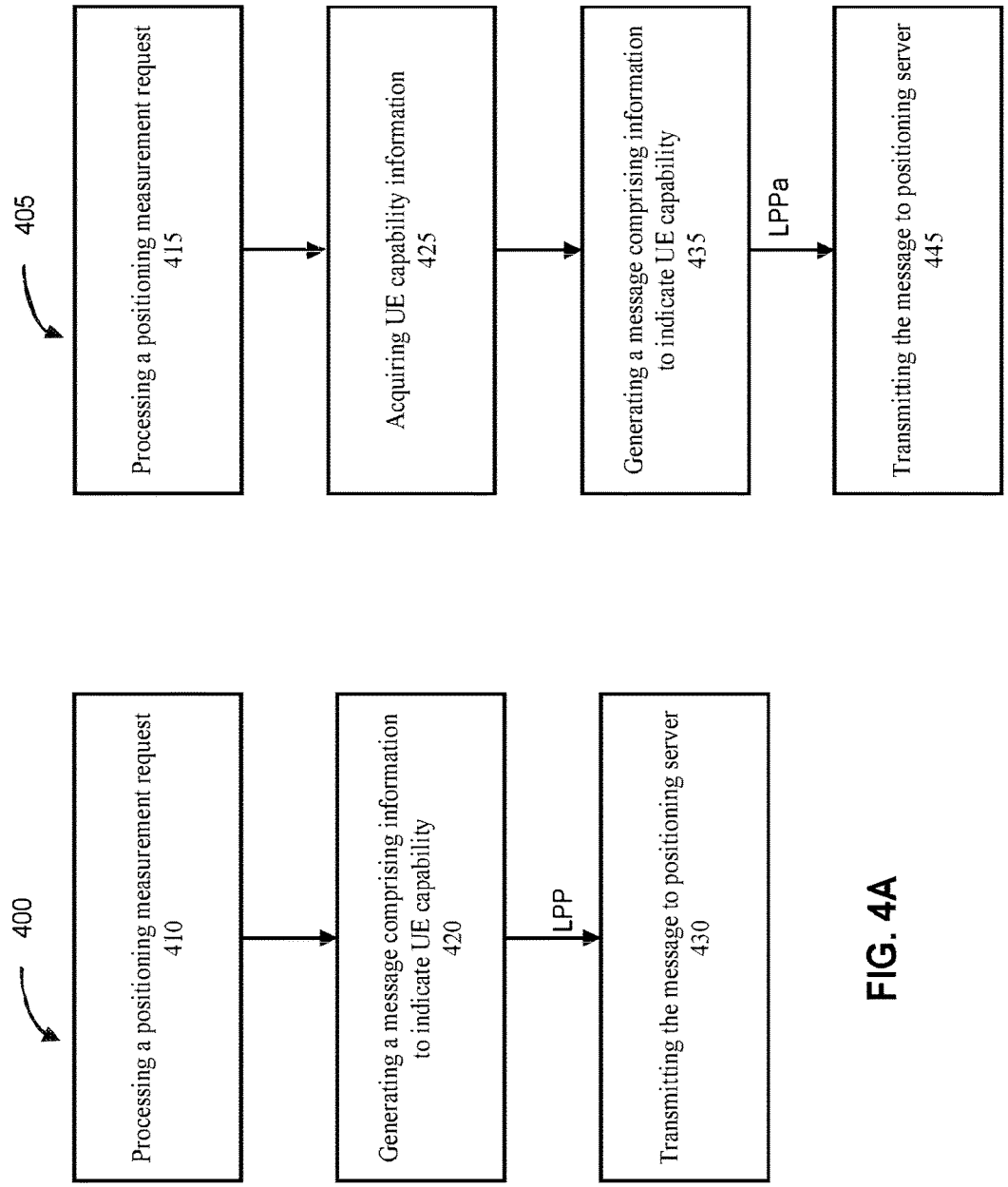
FIG. 4A and FIG. 4B illustrate operation flow/algorithmic structures to notify a positioning server of UE capability information from a UE perspective and a serving cell perspective, respectively, in accordance with some embodiments.

It is worth noting that a receiver chain may correspond to one or more antennas, or an antenna array depending on an operating RF frequency. For operating RF frequencies in millimeter wave range, or for frequencies higher than 6 GHz, it is common to implement an antenna array for better reception and/or directional reception. In those implemented antenna array scenarios, one receiver chain may be considered to correspond to one Rx antenna, unless otherwise indicated. "Rx chain" and "Rx antenna" are used interchangeably herein. FIG. 4A illustrates an operation flow/algorithmic structure 400 to notify the positioning server 140 of capability information of the UE 105 in accordance with some embodiments. The operation flow/algorithmic structure 400 may be performed by the UE 105 or circuitry thereof (for example, baseband circuitry 204).

The operation flow/algorithmic structure 400 may include, at 410, processing a positioning measurement request. In some embodiments, the UE 105 may receive the positioning measurement request from the positioning server 140, or some other entity in a network.

The operation flow/algorithmic structure 400 may further include, at 420, generating a message comprising information to indicate UE capability. The UE capability of this context may refer to a capability of the UE 105 that is related to performing a positioning measurement. In some embodiments, the UE capability information may include a number of Rx chains or Rx antennas with which the UE 105 is equipped or a number of Rx chains or Rx antennas of the UE 105 that may be used for the positioning measurement. In various embodiments, the number of Rx chains may be 1, 2, 4, or some other number depending on UE receiver capability.

Alternatively or additionally, the UE capability information may include an LTE UE category of the target UE 105, which can be Category 0, Category 1, Category M, or some other 3GPP category.

Alternatively or additionally, the UE capability information may include an indication for a normal delay with respect to the positioning measurement if the UE does not need additional delay with respect to the positioning measurement. Otherwise, the UE capability information may include an indication for an extended delay if the UE is equipped with one Rx chain and needs additional time to conduct the positioning measurement. The delay may be a measurement delay or a reporting delay associated with the positioning measurement.

In an example of RSTD measurement requirement, a UE is required to measure and provide an RSTD measurement report with respect to multiple cells in the network within certain amount of time, $T_{RSTD\ IntraFreqFDD,\ E-UTRAN}$, is given by $$T_{RSTD\ IntraFreqFDD\text{-}E\text{-}UTRAN} = T_{PRS} \cdot (M-1) + \Delta \text{ ms}$$

where $T_{PRS}$ is the cell-specific positioning subframe configuration period and M is the number of positioning reference signal (PRS) positioning occasions, which is 16 when $T_{PRS}$ is 160 ms and 8 when $T_{PRS}$ is larger than 160 ms.

The target UE 105 may incorporate one or more of the above identified UE capability information in an observed time difference of arrival (OTDOA) message that provides OTDOA positioning capabilities (e.g., in an OTDOA-ProvideCapabilities information element) to a positioning server. The UE capability information may be included in, or separate from, the OTDOA-ProvideCapabilities information element.

The operation flow/algorithmic structure 400 may further include, at 430, providing the message to RF circuitry 206 for transmission to the positioning server 140. The message may be generated and transmitted via an LPP or similar protocol that relates to communication between the positioning server and the target UE. Upon receiving the UE capability information, the positioning server 140 may configure corresponding positioning measurement configuration for the target UE based on the received UE capability information.

FIG. 4B illustrates an operation flow/algorithmic structure 405 to notify the positioning server 140 of capability information of the UE 105 in accordance with some embodiments. The operation flow/algorithmic structure 405 may be performed by an AN 110 or a serving cell or circuitry therein.

The operation flow/algorithmic structure 405 may include, at 415, processing a positioning measurement request. In some embodiments, the AN 110 or serving cell may receive the positioning measurement request from the positioning server 140, or some other entity in a network.

The operation flow/algorithmic structure 405 may include, at 425, acquiring UE capability information. The UE capability information, for example, may include a number of Rx chains, or an LTE UE category of the UE.

The operation flow/algorithmic structure 405 may further include, at 435, generating a message comprising information to indicate the target UE capability. The target UE capability may be similar to the UE capability discussed above with respect to FIG. 4A.

The operation flow/algorithmic structure 405 may further include, at 445, providing the message to RF circuitry 206 for transmission to the positioning server 140. The message may be generated and transmitted via an LTE positioning protocol annex (LPPa) or similar protocol that relates to communication between the positioning server and the AN. Upon receiving the UE capability information, the positioning server 140 may configure corresponding positioning measurement configuration for the target UE based on the received UE capability information.

Figure 5:
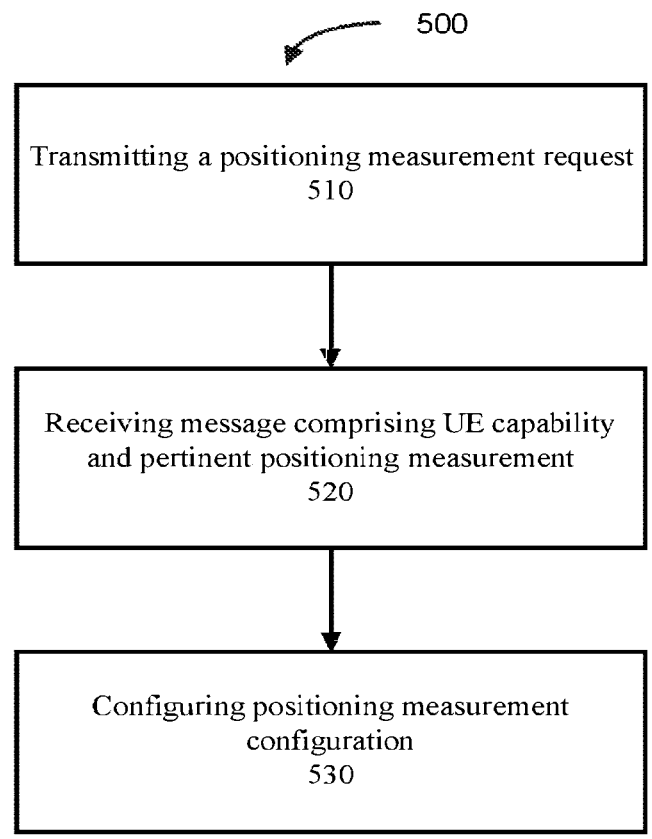
FIG. 5 illustrates an operation flow/algorithmic structure to initiate and process a positioning measurement from a positioning server perspective in accordance with some embodiments.

FIG. 5 illustrates an operation flow/algorithmic structure 500 to initiate and process the positioning measurements in accordance with some embodiments. The operation flow/algorithmic structure 500 may be performed by the positioning server 140 or circuitry thereof.

The operation flow/algorithmic structure 500 may include, at 510, transmitting a positioning measurement request to the UE 105 or AN 110. In some embodiments, a positioning measurement may be initiated by the positioning server 140. In other embodiments, a positioning measurement may be initiated by MME 130, and the positioning server 140 may transmit the positioning measurement request upon processing an initialization message received from the MME 130.

The operation flow/algorithmic structure 500 may include, at 520, receiving the message generated by the UE 105 at 420, wherein the message includes the UE capability information. The message may also include RSTD measured by the UE 105 if the message is incorporated in the OTDOA-ProvideCapabilities information element.

The operation flow/algorithmic structure 500 may include, at 530, configuring corresponding positioning measurement configuration for the target UE based on the received message. Positioning server 140 may utilize corresponding measurement delay or reporting delay for the position measurement based on the received UE capability information. In some examples, the positioning server 140 may determine adequate measurement delay or reporting delay with respect to the target UE. For example, if the positioning server 140 acknowledges that the UE 105 is equipped with one Rx chain, it may utilize an extended measurement delay or reporting delay rather than a normal delay to allocate longer time for the positioning measurement associated with the 1Rx UE. This may mitigate any false measurement inaccuracy or error that may be unnecessarily introduced by 1Rx UEs.

The communication between the positioning server and the target UE may be via LPP; and the communication between the positioning server and the eNB may be via LPPa. In an example, the position server may be an enhanced serving mobile location centre (eSMLC).

Figure 6:
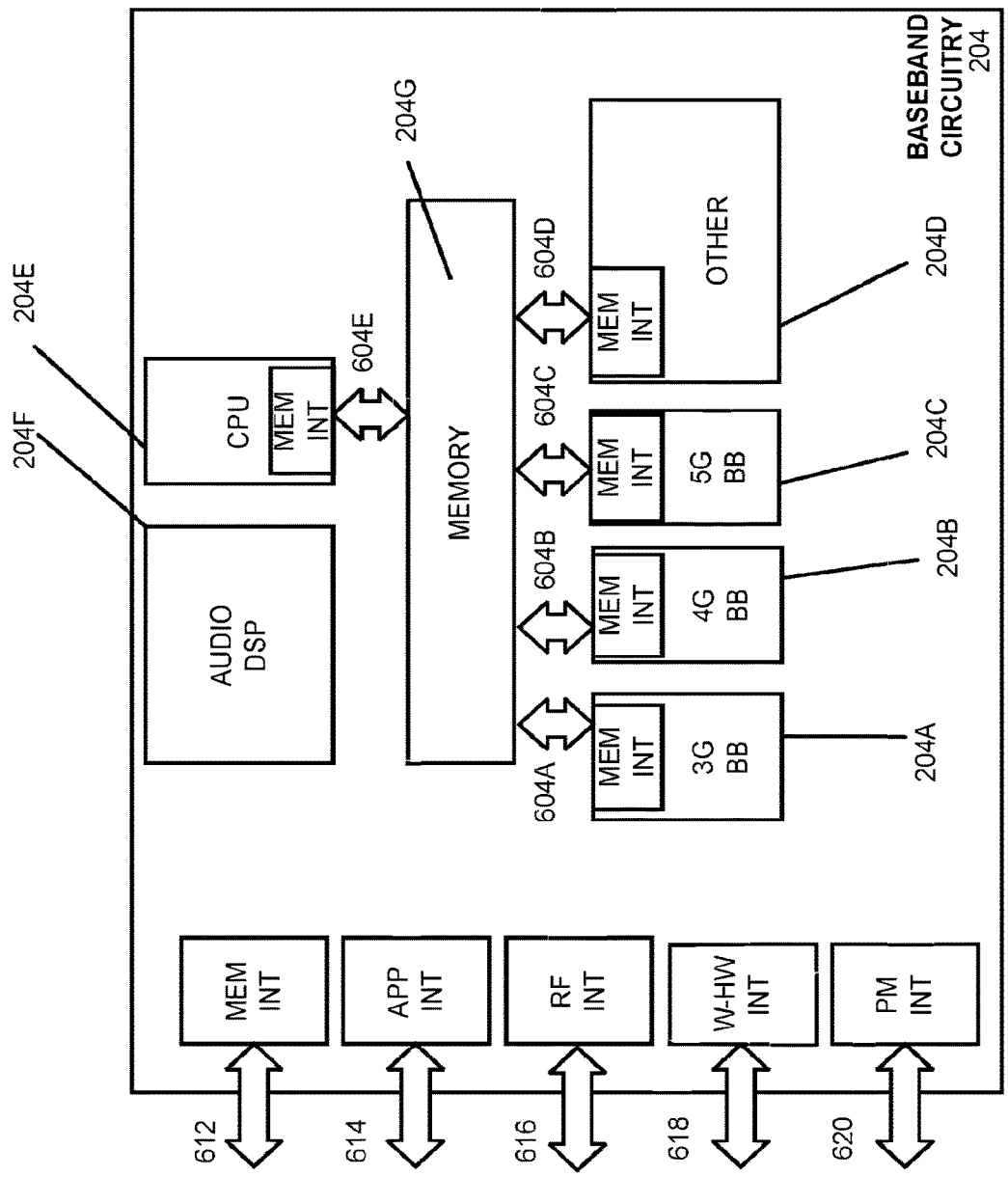
FIG. 6 illustrates example interfaces of baseband circuitry in accordance with some embodiments.

FIG. 6 illustrates example interfaces of baseband circuitry in accordance with some embodiments. As discussed above, the baseband circuitry 204 of FIG. 2 may comprise processors 204A-204E and a memory 204G utilized by said processors. Each of the processors 204A-204E may include a memory interface, 604A-604E, respectively, to send/receive data to/from the memory 204G.

The baseband circuitry 204 may further include one or more interfaces to communicatively couple to other circuitries/devices, such as a memory interface 612 (e.g., an interface to send/receive data to/from memory external to the baseband circuitry 204), an application circuitry interface 614 (e.g., an interface to send/receive data to/from the application circuitry 202 of FIG. 2), an RF circuitry interface 616 (e.g., an interface to send/receive data to/from RF circuitry 206 of FIG. 2), a wireless hardware connectivity interface 618 (e.g., an interface to send/receive data to/from Near Field Communication (NFC) components, Bluetooth® components (e.g., Bluetooth® Low Energy), Wi-Fi® components, and other communication components), and a power management interface 620 (e.g., an interface to send/receive power or control signals).

Figure 7:
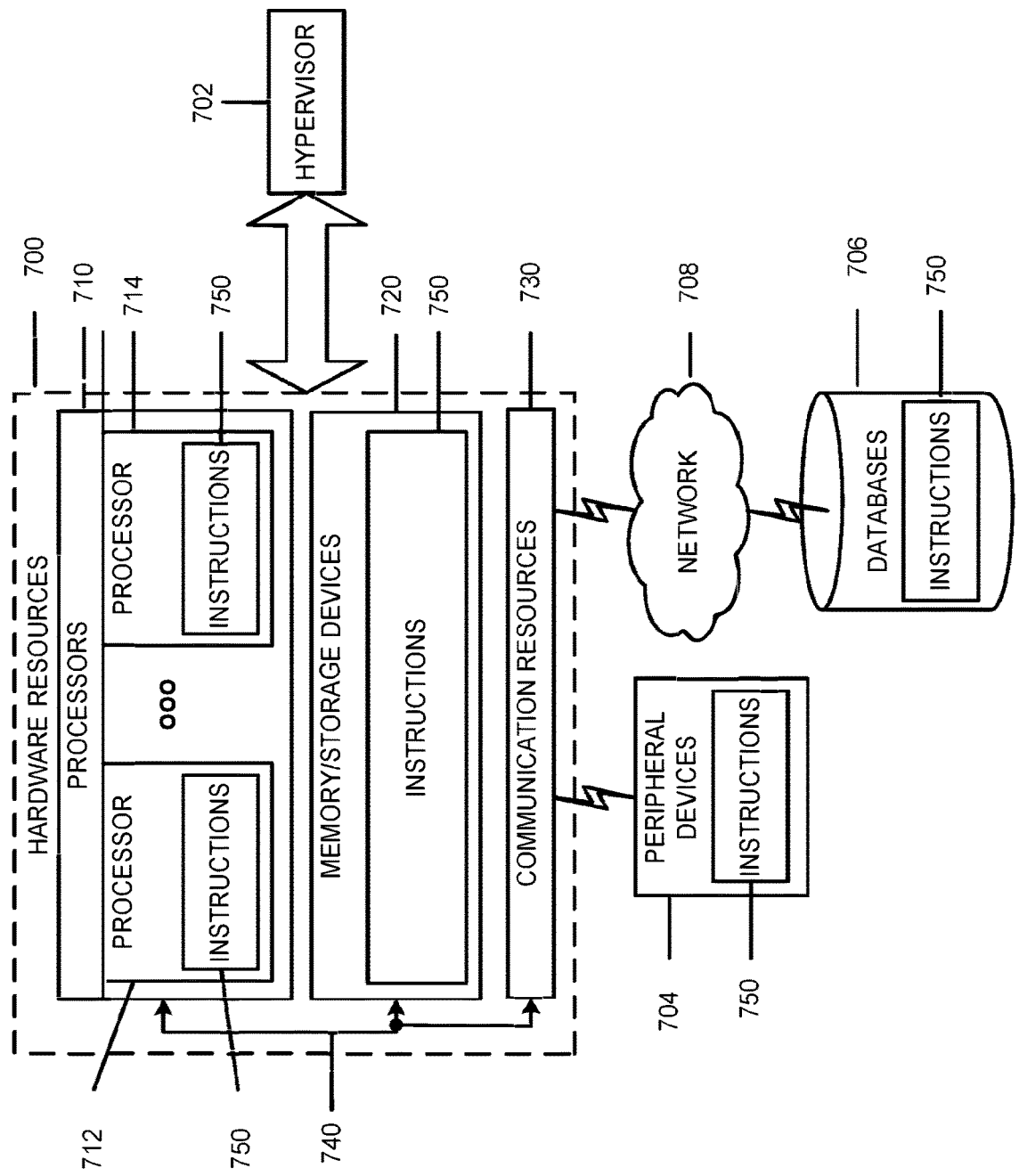
FIG. 7 illustrates hardware resources in accordance with some embodiments.

FIG. 7 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740. For embodiments where node virtualization (e.g., network function virtualization (NFV)) is utilized, a hypervisor 702 may be executed to provide an execution environment for one or more network slices/sub-slices to utilize the hardware resources 700.

The processors 710 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 712 and a processor 714.

The memory/storage devices 720 may include main memory, disk storage, or any suitable combination thereof. The memory/storage devices 720 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 730 may include interconnection or network interface components or other suitable devices to communicate with one or more peripheral devices 704 or one or more databases 706 via a network 708. For example, the communication resources 730 may include wired communication components (e.g., for coupling via a Universal Serial Bus (USB)), cellular communication components, NFC components, Bluetooth® components (e.g., Bluetooth® Low Energy), Wi-Fi®® components, and other communication components.

Instructions 750 may comprise software, a program, an application, an applet, an app, or other executable code for causing at least any of the processors 710 to perform any one or more of the methodologies discussed herein. For example, in an embodiment in which the hardware resource 700 are implemented into the UE 105, the instructions 750 may cause the UE to perform some or all of the operation flow/algorithmic structure 400. In other embodiments, the hardware resource 700 may be implemented into the AN 110, or the positioning server 140. The instructions 750 may cause the AN 110 or the positioning server 140 to perform some or all of the operation flow/algorithmic structure 405 or 500 respectively. The instructions 750 may reside, completely or partially, within at least one of the processors 710 (e.g., within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

Some non-limiting Examples of various embodiments are provided below.

Example 1 may include one or more computer-readable media comprising instructions to, upon execution of the instructions by one or more processors of a user equipment (UE), cause the UE to: process a positioning measurement request; generate, based on the positioning measurement request, a message comprising information to indicate a number of receiver antennas of the UE; and transmit the message to a positioning server.

Example 2 may include the one or more computer-readable media of example 1 and/or some other example herein, wherein the positioning measurement request is to be received from the positioning server.

Example 3 may include the one or more computer-readable media of example 1 and/or some other example herein, wherein the UE is to transmit the message to the positioning server via long term evolution (LTE) positioning protocol (LPP).

Example 4 may include the one or more computer-readable media of example 1 and/or some other example herein, wherein the positioning server is an enhanced serving mobile location centre (eSMLC).

Example 5 may include the one or more computer-readable media of example 1 and/or some other example herein, wherein the UE is equipped with one receiver (1Rx) antenna.

Example 6 may include the one or more computer-readable media of example 1 and/or some other example herein, wherein the UE is a category 1bis (Cat.1bis) UE.

Example 7 may include the one or more computer-readable media of example 1 and/or some other example herein, wherein the information to indicate the number of receiver antennas of the UE is incorporated in an observed time difference of arrival capability (OTDOA-ProvideCapabilities) information element.

Example 8 may include one or more computer-readable media comprising instructions to, upon execution of the instructions by one or more processors of a positioning server, cause the positioning server to: transmit a positioning measurement request to a user equipment (UE); and receive a message comprising information of a number of receiver antennas of the UE, based on the positioning measurement request.

Example 9 may include the one or more computer-readable media of example 8 and/or some other example herein, wherein the instructions, upon execution of the instructions by one or more processors of the positioning server, further cause the positioning server to configure a positioning measurement configuration based on the received message.

Example 10 may include the one or more computer-readable media of example 8 and/or some other example herein, wherein the positioning server is an enhanced serving mobile location centre (eSMLC).

Example 11 may include the one or more computer-readable media of example 8 and/or some other example herein, wherein the message complies with long term evolution (LTE) positioning protocol (LPP).

Example 12 may include one or more computer-readable media comprising instructions to, upon execution of the instructions by one or more processors of a serving cell for a user equipment (UE), cause the serving cell to: process a positioning measurement request targeting the UE from a positioning server; generate, based on the positioning measurement request, a message comprising information to indicate a number of receiver antennas of the UE; and transmit the message to the positioning server.

Example 13 may include the one or more computer-readable media of example 12 and/or some other example herein, wherein the serving cell is to transmit the message to the positioning server via long term evolution (LTE) positioning protocol annex (LPPa).

Example 14 may include the one or more computer-readable media of example 12 and/or some other example herein, wherein the positioning server is an enhanced serving mobile location centre (eSMLC).

Example 15 may include the one or more computer-readable media of example 12 and/or some other example herein, wherein the UE is equipped with one receiver (1Rx) antenna.

Example 16 may include an apparatus of baseband circuitry in a user equipment (UE), comprising: one or more baseband processors to receive a positioning measurement request from a positioning server; and a central processing unit (CPU) coupled with the baseband processors, the CPU to generate, based on the positioning measurement request, a message that includes information to indicate a number of receiver antennas of the UE, to indicate an LTE UE category of the UE, or to indicate an extended/normal measurement delay or reporting delay in a positioning measurement targeting the UE.

Example 17 may include the apparatus of example 16 and/or some other example herein, wherein the one or more baseband processors are further to transmit the message to the positioning server via long term evolution (LTE) positioning protocol (LPP).

Example 18 may include the apparatus of example 16 and/or some other example herein, wherein the positioning server is an enhanced serving mobile location centre (eSMLC).

Example 19 may include the apparatus of example 16 and/or some other example herein, wherein the UE is equipped with one receiver (1Rx) antenna.

Example 20 may include the apparatus of example 16 and/or some other example herein, wherein the LTE UE category of the UE is Category 0, Category M, or Category 1bis.

Example 21 may include the apparatus of example 16 and/or some other example herein, wherein the message is incorporated in an observed time difference of arrival capability information (OTDOA-ProvideCapabilities).

Example 22 may include a serving cell associated with a user equipment (UE) in a network, comprising: baseband circuitry to receive a positioning measurement request targeting the UE from a positioning server; and processing circuitry coupled with the baseband circuitry, the processing circuitry to generate, based on the positioning measurement request targeting the UE, a message comprising information to indicate a number of receiver antennas of the UE, to indicate an LTE UE category of the UE, or to indicate an extended/normal measurement delay or reporting delay in a positioning measurement targeting the UE.

Example 23 may include the apparatus of example 22 and/or some other example herein, wherein the baseband circuitry is further to transmit the message to the positioning server via long term evolution (LTE) positioning protocol annex (LPPa).

Example 24 may include the apparatus of example 22 and/or some other example herein, wherein the positioning server is an enhanced serving mobile location centre (eSMLC).

Example 25 may include an apparatus of a user equipment (UE) comprising: reception means for receiving a positioning measurement request from a positioning server; generation means for generating a message comprising information to indicate a user equipment (UE) capability information, based on the positioning measurement request; and transmission means for transmitting the message to the positioning server.

Example 26 may include the apparatus of example 25 and/or some other example herein, wherein the UE capability information comprises an amount of receiver antennas of the UE or an LTE UE category of the UE.

Example 27 may include the apparatus of example 25 and/or some other example herein, wherein the transmission of the message to the positioning server is via long term evolution (LTE) positioning protocol (LPP).

Example 28 may include the apparatus of example 25 and/or some other example herein, wherein the positioning server is an enhanced serving mobile location centre (eSMLC).

Example 29 may include the apparatus of example 25 and/or some other example herein, wherein the UE is equipped with one receiver (1Rx) antenna.

Example 30 may include the apparatus of example 26 and/or some other example herein, wherein the LTE UE category of UE comprises Category 0, Category M, or Category 1bis.

Example 31 may include the apparatus of examples 29 and 30 and/or some other example herein, wherein the UE capability information comprises an extended measurement delay or reporting delay in a positioning measurement targeting the UE.

Example 32 may include the apparatus of examples 29 and 30 and/or some other example herein, wherein the UE capability information comprises a normal measurement delay or reporting delay in a positioning measurement targeting the UE.

Example 33 may include the apparatus of example 25 and/or some other example herein, wherein the message is incorporated in an observed time difference of arrival capability information (OTDOA-ProvideCapabilities).

Example 34 may include an apparatus of a serving cell for a user equipment (UE) in a network, comprising: reception means for receiving a positioning measurement request from a positioning server targeting a user equipment (UE) in a network associated to a serving cell; generation means for generating a message comprising information to indicate UE capability information of the targeting UE, based on the positioning measurement request; and transmission means for transmitting the message to the positioning server via long term evolution (LTE) positioning protocol annex (LPPa).

Example 35 may include the apparatus of example 34 and/or some other example herein, wherein the UE capability information comprises an amount of receiver antennas of the UE, or an LTE UE category of the UE.

Example 36 may include the apparatus of example 34 and or some other example herein, wherein the positioning server is an enhanced serving mobile location centre (eS-MLC).

Example 37 may include the apparatus of examples 34 and 36 and/or some other example herein, wherein the UE is equipped with one receiver (1Rx) antenna.

Example 38 may include the apparatus of examples 34 and 37 and/or some other example herein, wherein the UE capability information comprises an extended measurement delay or reporting delay in a positioning measurement targeting the UE.

Example 39 may include the apparatus of examples 34 and 37 and/or some other example herein, the UE capability information comprises a normal measurement delay or reporting delay in a positioning measurement targeting the UE.

Example 40 may include a method comprising: receiving or cause to receive a positioning measurement request from a positioning server; generating or cause to generate a message comprising information to indicate a user equipment (UE) capability information, based on the positioning measurement request; and transmitting or cause to transmit the message to the positioning server.

Example 41 may include the method of example 40 and/or some other example herein, wherein the UE capability information comprises an amount of receiver antennas of the UE.

Example 42 may include the method of example 40 and/or some other example herein, wherein the UE capability information comprises an LTE UE category of the UE.

Example 43 may include the method of examples 42 and/or some other example herein, wherein the LTE UE category of UE comprises Category 0, Category M, or Category this.

Example 44 may include the method of example 40 and/or some other example herein, wherein the UE capability information comprises an extended measurement delay or reporting delay in a positioning measurement targeting the UE.

Example 45 may include the method of example 40 and/or some other example herein, wherein the UE capability information comprises a normal measurement delay or reporting delay in a positioning measurement targeting the UE.

Example 46 may include the method of example 40 and/or some other example herein, wherein the transmission of the message to the positioning server is via long term evolution (LTE) positioning protocol (LPP).

Example 47 may include the method of example 40 and/or some other example herein, wherein the positioning server is an enhanced serving mobile location centre (eS-MLC).

Example 48 may include the method of example 40 and/or some other example herein, wherein the UE is equipped with one receiver (1Rx) antenna.

Example 49 may include the method of example 40 and/or some other example herein, wherein the message is incorporated in an observed time difference of arrival capability information (OTDOA-ProvideCapabilities).

Example 50 may include a method comprising: receiving or causing to receive a positioning measurement request from a positioning server targeting a user equipment (UE) in a network associated with a serving cell; generating or causing to generate a message comprising information to indicate UE capability information of the targeting UE, based on the positioning measurement request; and transmitting or causing to transmit the message to the positioning server via long term evolution (LTE) positioning protocol annex (LPPa).

Example 51 may include the method of example 50 and/or some other example herein, wherein the UE capability information comprises an amount of receiver antennas of the UE.

Example 52 may include the method of example 50 and/or some other example herein, wherein the UE capability information comprises an LTE UE category of the UE.

Example 53 may include the method of example 50 and/or some other example herein, wherein the positioning server is an enhanced serving mobile location centre (eS-MLC).

Example 54 may include the method of example 50 and/or some other example herein, wherein the UE capability information comprises an indication of an extended measurement delay or reporting delay in a positioning measurement targeting the UE.

Example 55 may include the method of example 50 and/or some other example herein, wherein the UE capability information comprises an indication of a normal measurement delay or reporting delay in a positioning measurement targeting the UE.

Example 56 may include the method of examples 50-55 and/or some other example herein, wherein the UE is equipped with one receiver (1Rx) antenna.

The present disclosure is described with reference to flowchart illustrations or block diagrams of methods, apparatus (systems) and computer program products according to embodiments of the disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart or block diagram block or blocks.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

What is claimed is:

1. One or more non-transitory computer-readable media storing instructions that, when executed, cause one or more processors of a positioning server to perform operations comprising:
    transmitting a positioning measurement request message to a user equipment (UE);
    receiving, from the UE, a signaling message indicating observed time difference of arrival (OTDOA) positioning capabilities of the UE, the indicated OTDOA positioning capabilities including one or more of:
        a number of downlink receive antennas supported by the UE for positioning measurement,
        information corresponding to a long term evolution (LTE) category of the UE, or information corresponding to a normal delay or extended delay associated with the positioning measurement;
    determining, based on the OTDOA positioning capabilities indicated by the signaling message, the number of downlink receive antennas supported by the UE for reference signal time difference (RSTD) measurement; and
    in response to determining the number of downlink receive antennas supported by the UE for RSTD measurement, configuring a measurement delay for the UE to report an RSTD measurement.

2. The one or more non-transitory computer-readable media of claim 1, wherein the signaling message includes an OTDOA ProvideCapabilities information element (IE) that provides information indicating the OTDOA positioning capabilities of the UE.

3. The one or more non-transitory computer-readable media of claim 1, wherein the indicated OTDOA positioning capabilities included in the signaling message comprise information indicating that the UE is equipped with one of one receiver (1Rx) antenna, two receiver (2Rx) antennae, or 4 receiver (4Rx) antennae, for RSTD measurement.

4. The one or more non-transitory computer-readable media of claim 1, wherein the indicated OTDOA positioning capabilities included in the signaling message comprise information indicating that the UE is one of a LTE Category 0, Category 1, or Category M, UE.

5. The one or more non-transitory computer-readable media of claim 1, wherein the positioning measurement request message and the signaling message are based on one of LTE Positioning Protocol (LPP) or LTE Positioning Protocol annex (LPPa).

6. The one or more non-transitory computer-readable media of claim 1, wherein transmitting the positioning measurement request message to the UE comprises transmitting the positioning measurement request message using location management unit that is configured to perform positioning measurement operations for the positioning server, and
    wherein the signaling message from the UE is received using location management unit.

7. The one or more non-transitory computer-readable media of claim 1, wherein the positioning server is an enhanced serving mobile location center (eSMLC).

8. A method performed by a user equipment (UE), the method comprising:
    receiving a positioning measurement request;
    generating a message to indicate one or more capabilities of the UE corresponding to positioning measurement, the message including an observed time difference of arrival capability (OTDOA-ProvideCapabilities) information element (IE), wherein the OTDOA-ProvideCapabilities IE includes information indicating that the UE is equipped with one receiver (1Rx) antenna for reference signal time difference (RSTD) measurement; and
    transmitting the message in response to the positioning measurement request.

9. The method of claim 8, wherein receiving the positioning measurement request comprises receiving the positioning measurement request from an enhanced serving mobile location center (eSMLC), and
    wherein transmitting the message in response to the positioning measurement request comprises transmitting the message to the eSMLC.

10. The method of claim 8, wherein the message is transmitted via long term evolution (LTE) positioning protocol (LPP).

11. The method of claim 8, further comprising:
    executing a RSTD measurement using the 1Rx antenna.

12. The method of claim 8, wherein the OTDOA ProvideCapabilities IE includes information indicative of a category of the UE, and
    wherein the UE belongs to one of LTE Category 0, Category M, or Category 1.

13. A method performed by a positioning server, the method comprising:
    transmitting a positioning measurement request to a user equipment (UE); and
    receiving, from the UE, a message including an observed time difference of arrival capability (OTDOA-ProvideCapabilities) information element (IE), wherein the OTDOA-ProvideCapabilities IE includes information indicating that the UE is equipped with one receiver (1Rx) antenna for reference signal time difference (RSTD) measurement.

14. The method of claim 13, further comprising:
    determining, from the information included in the OTDOA-ProvideCapabilities IE obtained from the message, that the UE is equipped with one receiver (1Rx) antenna for RSTD measurement; and
    in response to determining that the UE is equipped with 1Rx antenna for RSTD measurement, configuring an extended measurement delay for the UE to report an RSTD measurement.

15. The method of claim 13, wherein the positioning server is an enhanced serving mobile location center (eSMLC).

16. The method of claim 13, wherein the message is received using long term evolution (LTE) positioning protocol (LPP).

17. One or more non-transitory computer-readable media storing instructions that, when executed, cause one or more processors of a user equipment (UE) to perform operations comprising:

generating a signaling message indicating observed time difference of arrival (OTDOA) positioning capabilities of the UE, the indicated OTDOA positioning capabilities including a number of downlink receive antennas supported by the UE for positioning measurement, comprising information indicating that the UE is equipped with one of one receiver (1Rx) antenna, two receiver (2Rx) antennae, or 4 receiver (4Rx) antennae, for reference signal time difference (RSTD) measurement; and transmitting the signaling message to a positioning server.

18. The one or more non-transitory computer-readable media of claim 17, wherein the indicated OTDOA positioning capabilities further include one or more of:

information corresponding to a long term evolution (LTE) category of the UE, or information corresponding to a normal delay or extended delay associated with the positioning measurement.

\* \* \* \* \*